(12) United States Patent
Prast et al.

(10) Patent No.: US 9,586,271 B2
(45) Date of Patent: Mar. 7, 2017

(54) DRILL CUTTING INSERT

(75) Inventors: Josef Prast, Pflach (AT); Remus Venturini, Rosshaupten (DE); Uwe Schleinkofer, Reutte (AT)

(73) Assignee: Ceratizit Austria Gesellschaft M.B.H., Reutte (AT)

( * ) Notice: Subject to any disclaimer, the term of this patent is extended or adjusted under 35 U.S.C. 154(b) by 350 days.

(21) Appl. No.: 14/131,029

(22) PCT Filed: Jul. 3, 2012

(86) PCT No.: PCT/AT2012/000179
§ 371 (c)(1),
(2), (4) Date: Mar. 14, 2014

(87) PCT Pub. No.: WO2013/003874
PCT Pub. Date: Jan. 10, 2013

(65) Prior Publication Data
US 2014/0212235 A1    Jul. 31, 2014

(30) Foreign Application Priority Data
Jul. 5, 2011    (AT) ................................ GM382/2011

(51) Int. Cl.
*B23B 51/00*    (2006.01)
*B23B 51/04*    (2006.01)
*B23B 27/14*    (2006.01)

(52) U.S. Cl.
CPC .......... *B23B 51/048* (2013.01); *B23B 27/145* (2013.01); *B23B 2200/0476* (2013.01);
(Continued)

(58) Field of Classification Search
CPC ............ B23B 2252/50; B23B 2252/52; B23B 51/048; B23B 2200/204; B23B 2251/28;
(Continued)

(56) References Cited

U.S. PATENT DOCUMENTS 4,889,456 A * 12/1989 Killinger ................ B23B 51/04
                                                              408/224
5,269,618 A * 12/1993 Meyer ................... B23B 51/048
                                                              408/188
(Continued)

FOREIGN PATENT DOCUMENTS

DE    4126241 A1    2/1993
DE    9407575 U1    9/1994
(Continued)

*Primary Examiner* — Daniel Howell
*Assistant Examiner* — Yasir Diab
(74) *Attorney, Agent, or Firm* — Laurence A. Greenberg; Werner H. Stemer; Ralph E. Locher

(57) ABSTRACT

A drill cutting insert has a cutting edge at a transition between a side surface and a top side which is formed with n identical cutting corners and n identical partial cutting edges —with n∈{3, 4} —extending between the cutting corners. Each of the n partial cutting edges has: adjoining a first cutting corner, a main lip which is straight in plan view of the top side; adjoining the other cutting corner, a secondary lip which is straight in plain view of the top side, and a transition section, via which the main lip and the secondary lip merge into one another and which has a convex section adjoining the main lip and a concave section adjoining the secondary lip. The main and secondary lips enclose on the outside an angle a α<180° in plan view of the top side.

15 Claims, 5 Drawing Sheets

(52) U.S. Cl.
CPC . *B23B 2200/0495* (2013.01); *B23B 2200/201* (2013.01); *B23B 2200/204* (2013.01); *B23B 2251/28* (2013.01); *B23B 2251/285* (2013.01); *B23B 2251/50* (2013.01); *B23B 2251/52* (2013.01); *Y10T 407/23* (2015.01); *Y10T 408/905* (2015.01); *Y10T 408/906* (2015.01); *Y10T 408/9098* (2015.01)

(58) Field of Classification Search
CPC .......... B23B 2251/285; B23B 2251/50; B23B 2251/52; Y10T 408/905; Y10T 408/906
See application file for complete search history.

(56) References Cited

U.S. PATENT DOCUMENTS

| | | | |
|---|---|---|---|
| 5,503,509 A | 4/1996 | von Haas et al. | |
| 5,890,853 A * | 4/1999 | Hiranaka | B23B 27/141 407/113 |
| 5,954,459 A | 9/1999 | Noguchi | |
| 6,929,432 B2 | 8/2005 | Roman et al. | |
| 8,480,337 B2 | 7/2013 | Bae | |
| 2001/0033779 A1 * | 10/2001 | Wiman | B23B 27/141 408/188 |
| 2003/0161696 A1 * | 8/2003 | Fritsch | B23B 51/048 408/223 |
| 2003/0223832 A1 * | 12/2003 | Roman | B23B 27/145 408/224 |
| 2009/0071723 A1 * | 3/2009 | Mergenthaler | B23B 27/141 175/394 |
| 2010/0061821 A1 | 3/2010 | Okumura | |
| 2010/0272526 A1 | 10/2010 | Dufour | |
| 2010/0296884 A1 * | 11/2010 | Okumura | B23B 51/048 408/56 |

FOREIGN PATENT DOCUMENTS

| | | |
|---|---|---|
| DE | 19736282 A1 | 2/1998 |
| DE | 69702040 T2 | 9/2000 |
| DE | 112008000315 T5 | 11/2009 |
| EP | 0775547 A1 | 5/1997 |
| EP | 2277645 A1 | 1/2011 |
| JP | H06509518 A | 10/1994 |
| JP | H09272006 A | 10/1997 |
| JP | 10180521 | 7/1998 |
| JP | 11104911 A * | 4/1999 |
| JP | 2000190107 | 7/2000 |
| JP | 2001252809 A | 9/2001 |
| JP | 2002066811 | 3/2002 |
| RU | 68394 U1 | 11/2007 |
| SU | 158766 A1 | 11/1963 |
| WO | 03099494 A1 | 12/2003 |
| WO | 2008153233 A1 | 12/2008 |
| WO | 2010126693 A1 | 11/2010 |

* cited by examiner

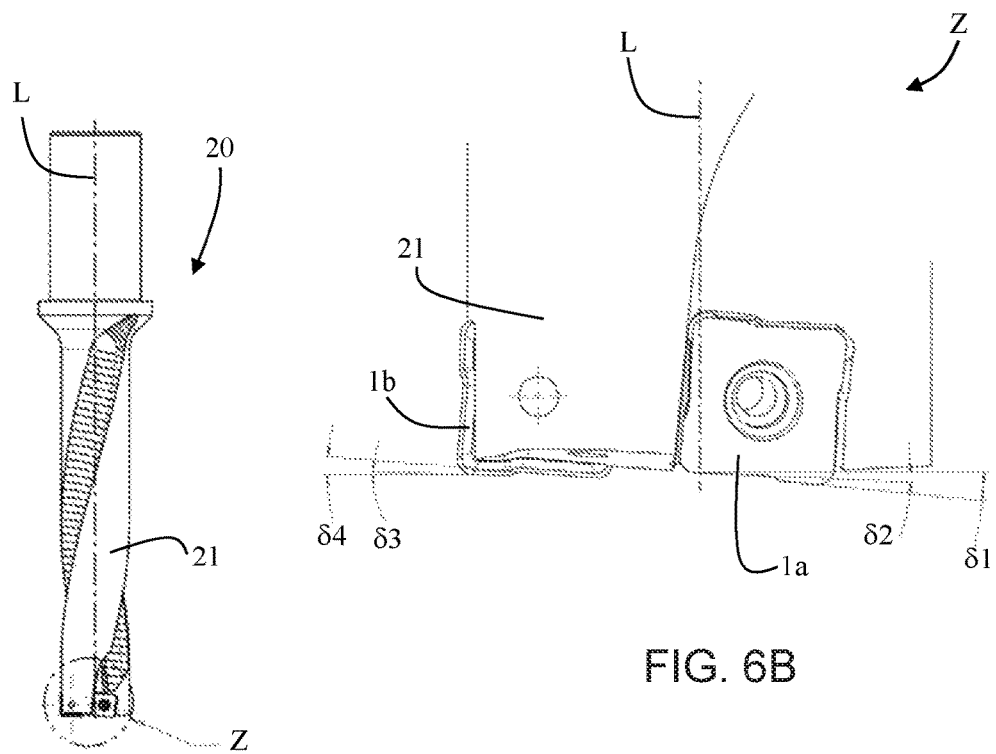
FIG. 6A
FIG. 6B
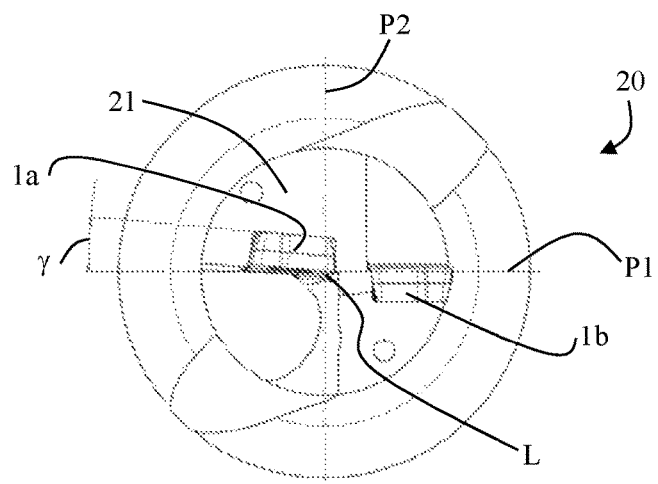
FIG. 7

B-B

DRILL CUTTING INSERT

BACKGROUND OF THE INVENTION

Field of the Invention

The present invention relates to a drill cutting insert and to a drilling tool having at least two identical drill cutting inserts.

For drilling into, in particular, solid metal material it is known to use drilling tools which have a basic body which is rotatable about a longitudinal axis and is provided with a plurality of exchangeable cutting inserts, which are able to be formed, for example, by index able inserts.

WO 03/099494 A1 describes, for example, a drilling tool which has a basic body and two cutting inserts, one cutting insert forming a center insert and the other cutting insert forming an edge insert. Active cutting edges of the center insert and of the edge insert in use protrude in each case beyond the basic body in the axial direction and, when the drilling tool is operating, cause the chips to be removed from the material to be drilled.

If deep holes are to be drilled using a drilling tool of the aforementioned type, in particular holes at a depth T, which corresponds to a majority of the diameters D to be drilled (e.g. T>4 D), the drilling tool has to meet great demands in order to enable accurate drilling with a precisely defined diameter of the drill hole. In particular in the case of deep holes to be drilled, elastic deformation of the drilling tool which occurs during drilling can greatly affect the dimensional accuracy obtained. In order to keep the costs as low as possible, another desire is to obtain as long a service life as possible of the cutting inserts used. Both with reference to the processing accuracy and with reference to the wear and tear of the cutting inserts used, particular significance is given to the initial drilling behavior, i.e. the behavior of the drilling tool during the initial penetration of the active cutting edges of the cutting inserts into the material to be drilled, as at this moment there is still no lateral guiding of the tip of the drilling tool provided.

With regard to as cost-efficient an operation as possible of such types of drilling tools, it is advantageous when the cutting inserts used are realized as index able inserts with as many part cutting edges as possible which are to be used separately such that in the case of wear of one part cutting edge, a next not yet worn part cutting edge is able to be used. On the other hand, with regard to cost-efficient operation it is advantageous when the cutting inserts are able to be produced in quantities which are as large as possible.

As in the case of drilling tools provided with cutting inserts the cutting inserts have to be exchanged at regular intervals, it is additionally desirable to provide handling during the exchange of the cutting inserts which is as simple as possible.

BRIEF SUMMARY OF THE INVENTION

It is the object of the present invention to provide a drill cutting insert and a drilling tool with at least two cutting inserts which obtain as high a degree of processing accuracy as possible even in the case of deep holes to be drilled and, in this case, at the same time enable as cost-efficient an operation as possible and simple handling.

The object is achieved by a drill cutting insert as claimed. Advantageous further developments are provided in the dependent claims.

The drill cutting insert has a top surface, a bottom surface, a circumferential side face which connects the top surface and the bottom surface together, and a cutting edge which is realized at the transition between the side face and the top surface. The cutting edge is realized in such a manner that n identical cutting corners and n identical part cutting edges which in each case extend between two cutting corners, are realized. In this case, it is possible for n=3 or n=4. Each of the n part cutting edges has: adjoining a first cutting corner, a main cutting edge which is straight in a top view onto the top surface, adjoining the other cutting corner, a secondary cutting edge which is straight in a top view onto the top surface, and a transition portion, by means of which the main cutting edge and the secondary cutting edge merge into one another. The transition portion has a convex portion adjoining the main cutting edge and a concave portion adjoining the secondary cutting edge. In a top view onto the top surface, the main cutting edge and the secondary cutting edge enclose an angle $\alpha<180°$ with one another on the outside.

Enclosing an angle $\alpha<180°$ with one another "on the outside" is to be understood in the present context as the angle formed outside the drill cutting insert between the main cutting edge and the secondary cutting edge being measured and not the angle formed inside the drill cutting insert between the main cutting edge and the secondary cutting edge. In particular, the drill cutting insert can have an axis of symmetry about which there is n-fold rotational symmetry. The angle $\alpha$ is to be measured vertically with respect to the axis of symmetry in a plane in which the main cutting edge and the secondary cutting edge extend or onto which the main cutting edge and the secondary cutting edge are projected. The respective part cutting edge is formed by three portions which extend between two adjacent cutting corners in said sequence: the main cutting edge, the transition portion and the secondary cutting edge. The cutting corners can be formed, in particular, by a region with a predetermined radius which connects a main cutting edge and a secondary cutting edge of an adjacent part cutting edge together. The top surface of the drill cutting insert can be realized at least in a part region as a chip-conducting face for directing away chips created during drilling. The angle $\alpha$ can be, in particular, within a range of between 179° and 173°, in a preferred manner within a range of between 178° and 175° and in a more preferred manner 177°.

By arranging the main cutting edges and the secondary cutting edges in the specified manner, two identical drill cutting inserts of the drill cutting inserts as claimed in the invention are able to be arranged in a drilling tool in such a manner that both excellent processing accuracy, in particular as a result of excellent initial drilling behavior, is achieved and the unused further part cutting edges are reliably protected against wear. In addition, the specified arrangement enables the use of identical drill cutting inserts for a large bandwidth of diameters to be drilled, as the relative radial positioning of two identical drill cutting inserts with respect to one another is able to be varied over a wide region. In particular, for preparing different hole diameters the radial position of an outer drill cutting insert on a drilling tool is able to be altered. The usability of identical drill cutting inserts for a large bandwidth of diameters to be drilled, just as the usability of two identical drill cutting inserts as the inner cutting insert and outer cutting insert in one drilling tool, results in the drill cutting insert being able to be produced in high quantities. The usability of identical drill cutting inserts as the inner cutting insert and the outer cutting insert also makes particularly simple handling of the drilling tool possible.

As claimed in one development, the main cutting edge of a part cutting edge and the secondary cutting edge of an adjacent part cutting edge enclose an acute angle with one another such that an acute cutting corner is formed. An acute cutting corner, in this case, is to be understood as a cutting corner with a corner angle <90°. Where n=4, the corner angle can be, for example, between 89° and 83°, in a preferred manner between 88° and 85° and in a particularly preferred manner 87°. Where n=3, the corner angle can be, for example, between 59° and 53°, in a preferred manner between 58° and 55° and in a particularly preferred manner 57°. The acute arrangement of the cutting corner makes it possible, in particular where n=4, for both a particularly advantageous initial drilling behavior to be achieved and, in particular when drilling deep holes, damage to the already drilled region of the bore to be prevented as a result of a suitable alignment of two identical drill cutting inserts in one drilling tool.

As claimed in one development, the n main cutting edges extend along the contour of an imaginary first n-corner and the n secondary cutting edges extend along the contour of an imaginary second n-corner which has a smaller edge length than the imaginary first n-corner. In other words, this means that the n main cutting edges extend along tangents to a first circle and the n secondary cutting edges extend along tangents to a second circle which is concentric to the first circle, and the radius of the first circle is greater than the radius of the second circle. The radius of the first circle, in this case, can be between 2% and 20% larger than the radius of the second circle, e.g. by 5%. The imaginary first n-corner and the imaginary second n-corner can be aligned, for example, tilted toward one another in relation to their center by an angle between 1° and 7°, in a preferred manner between 2° and 5° and in a more preferred manner by 3°.

When the drill cutting insert has an axis of symmetry, about which there is n-fold rotational symmetry, and there is provided a bore which connects the top surface and the bottom surface together and which extends concentrically with respect to the axis of symmetry, an indexing alignment and fastening of the drill cutting insert on a drilling tool is then made possible in a particularly simple manner.

As claimed in one development, the drill cutting insert has an axis of symmetry, about which there is n-fold rotational symmetry, and the cutting edge extends in a plane which extends vertically with respect to the axis of symmetry. In a preferred manner, the cutting edge extends completely in such a plane, i.e. the main cutting edges, the transition portions, and the secondary cutting edges of the part cutting edges as well as the cutting edge in the region of the cutting corners extend in the same plane. In this case, a particularly advantageous initial drilling behavior is provided.

As claimed in one development, the circumferential side face is developed in such a manner that a positive clearance angle is formed along the entire cutting edge.

As claimed in one development, the length of the main cutting edge is between 20% and 80% of the length of the secondary cutting edge. In this case, particularly well-balanced drilling characteristics are obtained.

In a preferred manner, n=4, i.e. the cutting edge has four identical part cutting edges and four cutting corners. In this case, a high number of separately available part cutting edges are provided.

As claimed in one development, the top surface is provided with a chip-conducting structure, the width of which increases along a part cutting edge from the secondary cutting edge to the main cutting edge. The width of the chip-conducting structure is consequently larger in the region of the main cutting edge than in the region of the secondary cutting edge. As a result of said development, a particularly preferred chip development during drilling is achieved. The width of the chip-conducting structure, in this case, is measured vertically with respect to the cutting edge in a plane which extends vertically with respect to the axis of symmetry of the drill cutting insert. It must be noted that a continuous increase in the width of the chip-conducting structure is certainly preferred, but not compulsory. It is also preferred for the depth of the chip-conducting structure in the region of the main cutting edge to be greater than in the region of the secondary edge. The depth, in this case, is measured in a direction parallel to the axis of symmetry of a plane which includes the respective cutting edge in said region and extends vertically with respect to the axis of symmetry.

The object is also achieved by a drilling tool as claimed. Advantageous further developments are specified in the dependent claims.

The drilling tool has: a basic body which is rotatable about a longitudinal axis and at least one inner cutting insert and one outer cutting insert which is realized identically to the inner cutting insert and is arranged further outside in the radial direction. The inner cutting insert and the outer cutting insert are formed in each case by a drill cutting insert as claimed in the invention. The advantages already described beforehand with reference to the drill cutting insert are achieved with the drilling tool. In particular, a high degree of processing accuracy is obtained even where deep holes are to be drilled and in this case at the same time cost-efficient operation and simple handling are made possible.

As claimed in one development, the inner cutting insert protrudes beyond the basic body in the axial direction by way of an active part cutting edge and the outer cutting insert protrudes beyond the basic body in the axial direction by way of an active part cutting edge. In this case, in the case of the active part cutting edge of the inner cutting insert, the secondary cutting edge is arranged closer to the longitudinal axis than the main cutting edge which is arranged in front in the axial direction, and in the case of the active part cutting edge of the outer cutting insert, the secondary cutting edge is arranged closer to the longitudinal axis than the main cutting edge. As a result of said arrangement, in particular at the initial penetration of the drilling tool into the material to be drilled, a particularly sturdy behavior is achieved. In addition, it is ensured in this manner that identical drill cutting inserts are able to be used as the inner cutting insert and the outer cutting insert.

As claimed in one development, the main cutting edge of the active part cutting edge of the inner cutting insert is aligned in such a manner that its region which is distanced further from the longitudinal axis in the radial direction protrudes further in the axial direction than its region which is arranged closer to the longitudinal axis in the radial direction, and the main cutting edge of the active part cutting edge of the outer cutting insert is aligned in such a manner that its region which is arranged closer to the longitudinal axis in the radial direction protrudes further in the axial direction than its region which is distanced further form the longitudinal axis in the radial direction. In this case, a particularly preferred initial drilling behavior at the initial penetration of the drilling tool into the material to be drilled is obtained. As a result of the inclined setting of the inner cutting insert, a light force pushing outward in the radial direction is exerted during drilling, whereas as a result of the contra-directional setting of the outer cutting insert, a light force pushing inward in the radial direction is exerted such that the rotational movement of the drilling tool overall is stabilized. As a result of the described alignment of the main cutting edges, a guide face, which additionally contributes toward stabilization, is also realized during drilling in the material to be drilled. Consequently, a particularly advantageous initial drilling behavior and a high degree of processing accuracy are achieved even where the holes to be drilled are deep.

The object is also achieved by a drilling tool as claimed. Advantageous further developments are specified in the dependent claims.

The drilling tool has: a basic body which is rotatable about a longitudinal axis and at least one exchangeable inner cutting insert and one exchangeable outer cutting insert which is arranged further outside in the radial direction. The inner cutting insert and the outer cutting insert are realized in an identical manner and in each case have at least one part cutting edge which protrudes beyond the basic body in the axial direction, is realized in an identical manner and extends between two cutting corners. The part cutting edge has: adjoining a first cutting corner, a straight main cutting edge, adjoining the other cutting corner, a straight secondary cutting edge, and a transition portion by means of which the main cutting edge and the secondary cutting edge merge into one another and which has a convex portion adjoining the main cutting edge and a concave portion adjoining the secondary cutting edge. Both in the case of the inner cutting insert and in the case of the outer cutting insert, the main cutting edge is arranged further distanced from the longitudinal axis in the radial direction than the secondary cutting edge. The inner cutting insert is arranged in such a manner that the main cutting edge is arranged axially in front of the secondary cutting edge and is aligned in such a manner that its region which is distanced further from the longitudinal axis in the radial direction protrudes further in the axial direction than its region which is arranged closer to the longitudinal axis in the radial direction. The outer cutting insert is arranged in such a manner that the main cutting edge is aligned in such a manner that its region which is arranged closer to the longitudinal axis in the radial direction protrudes further in the axial direction than its region which is distanced further from the longitudinal axis in the radial direction.

Once again, the advantages already described beforehand are obtained with the drilling tool. As a result of the specified arrangement, on the one hand a particularly advantageous initial drilling behavior is obtained and on the other hand the drilling tool is stabilized during the drilling process as a guide face is realized at the front face in the material to be drilled. In addition, said arrangement enables the use of two identical drill cutting inserts with a plurality of separately usable, identical part cutting edges as the inner and the outer cutting insert.

As claimed in one development, the secondary cutting edge of the active part cutting edge of the outer cutting insert is arranged in such a manner that its region which is arranged closer to the longitudinal axis in the radial direction protrudes further in the axial direction than its region which is distanced further from the longitudinal axis in the radial direction. In said case, the described alignment of the secondary cutting edge brings about additional stabilization of the drilling process.

Further advantages and expediencies of the invention are produced by way of the following description of exemplary embodiments with reference to the accompanying figures.

The figures are as follows:

BRIEF DESCRIPTION OF THE SEVERAL VIEWS OF THE DRAWING

FIG. 6a: shows a representation of a drilling tool with two identical drill cutting inserts as claimed in the first embodiment;

FIG. 6b: shows an enlarged representation of the detail Z from FIG. 6a;

FIG. 7: shows a representation of the drilling tool with two identical drill cutting inserts as claimed in the first embodiment in a direction along a longitudinal axis of the drilling tool;

FIG. 10b shows part of a sectional representation along the line B-B in FIG. 10a.

DESCRIPTION OF THE INVENTION

Figure 1:
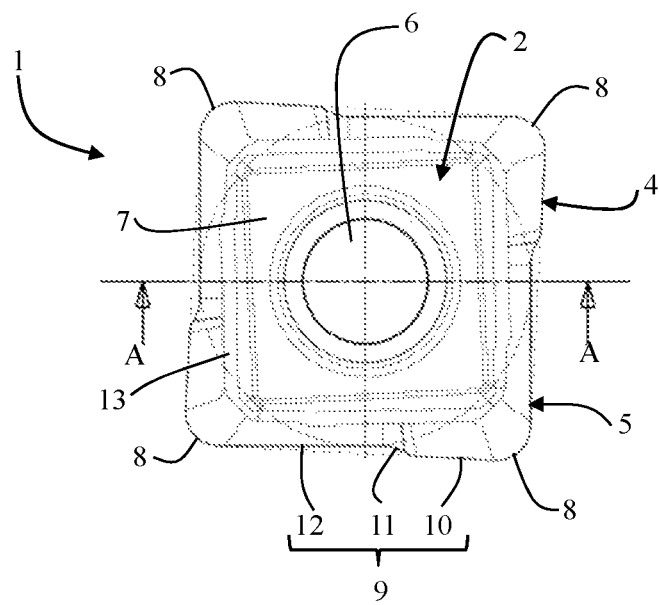
FIG. 1: shows a top view onto a drill cutting insert as claimed in a first embodiment.
Figure 2:
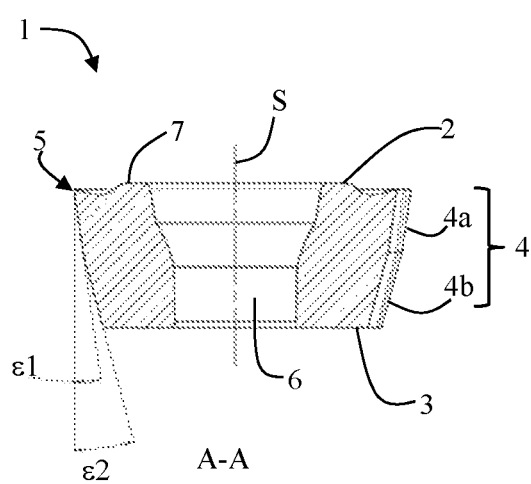
FIG. 2: shows a section along the line A-A of FIG. 1.

A first embodiment is described below with reference to FIG. 1 to FIG. 4 and FIG. 6 to FIG. 9. FIG. 1 shows a top view onto a drill cutting insert -1- as claimed in the first embodiment. The drill cutting insert -1- (also identified below simply as cutting insert -1-) has a top surface -2-, a bottom surface -3- and a circumferential side face -4- which connects the top surface -2- and the bottom surface -3- together. A cutting edge -5- which, in the case of the embodiment shown, is realized running around the entire edge of the top surface -2-, is formed at the transition between the side face -4- and the top surface -2-. The drill cutting insert -1-, in the case of the embodiment shown, has an axis of symmetry -S- which extends vertically with respect to the drawing plane in FIG. 1. With reference to its form, the drill cutting insert -1- has n-fold rotational symmetry about the axis of symmetry -S-, i.e. the drill cutting insert -1- has said same form when rotated by 360°/n about the axis of symmetry -S-. In the case of the first embodiment, n=4, i.e. the drill cutting insert -1- has fourfold rotational symmetry and can be transferred into said same form as a result of rotation by 90° about the axis of symmetry -S-. A bore -6- which extends concentrically with respect to the axis of symmetry -S- and penetrates the drill cutting insert -1- from the top surface -2- to the bottom surface -3- is provided. The bore -6- is surrounded by a circumferential face -7- which extends vertically with respect to the axis of symmetry -S- in a plane.

In the case of the first embodiment, in a top view onto the top surface -2-, the drill cutting insert -1- has a substantially square basic form which is modified in a few regions, as will be described below in even more detail. The drill cutting insert -1- has n cutting corners -8-, i.e. four cutting corners in the case of the first embodiment where n=4. Part cutting edges -9-, which - just as the cutting corners -8- form portions of the cutting edge -5-, extend in each case between two adjacent cutting corners -8-. The part cutting edges -9- are realized in an identical manner in each case and have a main cutting edge -10-, a transition portion -11- and a secondary cutting edge -12-. The main cutting edge -10- connects to the one cutting corner -8- which defines the respective part cutting edge -9- and the secondary cutting edge -12- connects to the other cutting corner -8- which defines the respective part cutting edge -9-. The main cutting edge -10- and the secondary cutting edge -12- merge into one another by means of the transition portion -11-, i.e. the transition portion -11- is a separate portion of the part cutting edge -9- which connects the main cutting edge -10- and the secondary cutting edge -12- together. In a top view onto the top surface -2-, which extends substantially vertically with respect to the axis of symmetry -S-, the main cutting edge -10- extends in a straight manner. The secondary cutting edge -12- also extends in a straight manner in a top view onto the top surface -2-. The transition portion -11- has a convex portion adjoining the main cutting edge -10- and a concave portion adjoining the secondary cutting edge -12-. The length of the secondary cutting edge -12-, in this case, is longer than that of the main cutting edge -10-, the ratio of the length of the main cutting edge -10- to the length of the secondary cutting edge -12- can be between 0.2 and 0.8 and in a preferred manner is between 0.4 and 0.52.

Figure 3:
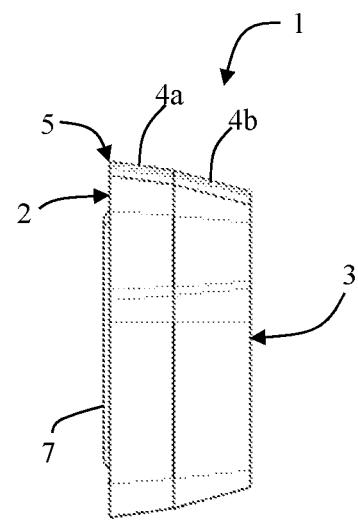
FIG. 3: shows a side view of the drill cutting insert from FIG. 1.
Figure 4:
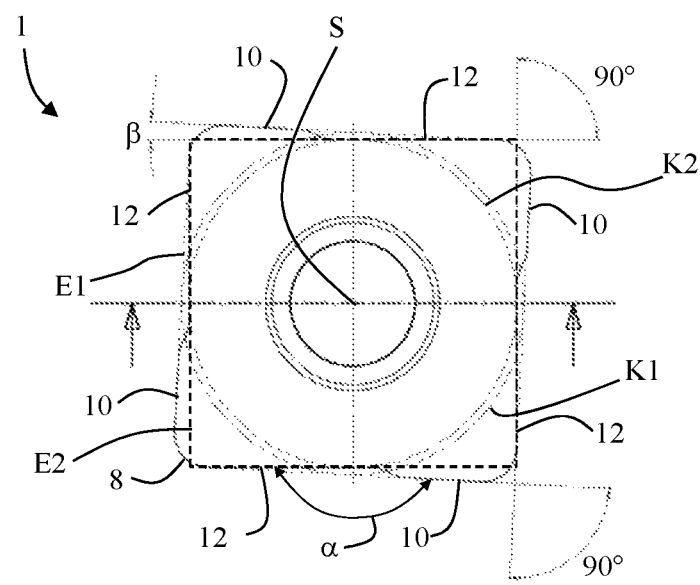
FIG. 4: shows a schematic representation corresponding to FIG. 1 to explain the development of the main and secondary cutting edges.

As can be seen in particular in FIG. 3, the cutting edge -5- extends over its entire development in a plane which extends vertically with respect to the axis of symmetry -S-, i.e. the cutting edge -5- extends vertically with respect to the axis of symmetry -S- in the same plane in the region of the cutting corners -8-, in the region of the main cutting edges -10-, in the region of the transition portions -11- and in the region of the secondary cutting edges -12-.

The main cutting edges -10- of, in each case, two adjacent part cutting edges -9- extend at an angle of 90° with respect to one another (where n=4), such that the main cutting edges -10- extend along the contour of an imaginary first n-corner -E1- (a square where n =4). In other words, in their extension, the main cutting edges -10- form tangents to a first circle -K1- about the axis of symmetry -S- of the drill cutting insert -1-.

The secondary cutting edges -12- of, in each case, two adjacent part cutting edges -9- also extend at an angle of 90° with respect to one another (where n=4) such that the secondary cutting edges -12- extend along the contour of an imaginary second n-corner -E2- (a square where n=4). In other words, the secondary cutting edges -12- form tangents to a second circle -K2-, which is concentric with respect to the first circle -K1-. The radius of the second circle -K2-, in this case, is smaller than the radius of the first circle -K1-. In this case, the ratio between the radius of the first circle -K1- and the radius of the second circle -K2- is between 1.02 and 1.2. In other words, the edge length of the second n-corner -E2- is smaller than the edge length of the first n-corner -E1-.

The imaginary first n-corner -E1 - is tilted by an angle -13- with reference to the axis of symmetry -S- in relation to the imaginary second n-corner -E2- in such a manner that the main cutting edge -10- and the secondary cutting edge -12- of a part cutting edge -9- form with one another, in each case, an exterior angle -α- (=180°-β-) which is less than 180° such that an end of the secondary cutting edge -12- which connects to the transition portion -11- is arranged offset in the direction of the axis of symmetry -S- in relation to a connecting line which connects two adjacent cutting corners -8-. The angle -β-, in this case, is between 1° and 7°, in a preferred manner between 2° and 5° and in the most preferred manner is 3°.

As a result of said development, between a main cutting edge -10- of a part cutting edge -9- and a secondary cutting edge -12- of an adjacent (by means of the cutting corner -8-) part cutting edge -9- an acute angle is formed (90°-β where n=4) such that an acute cutting corner -8- is formed. The cutting corner -8- itself has a constant corner radius in the case of the embodiment.

In the case of the first embodiment, the radii ratios between the circles -K1- and -K2- are selected in such a manner that an extension of the main cutting edge -10- would intersect the cutting edge -5- at the point where the secondary cutting edge -12- merges into the adjoining cutting corner -8-. It must be noted, however, that said development is not absolutely necessary.

The circumferential side face -4- has a top portion -4a- which faces the top surface -2- and a bottom portion -4b-which faces the bottom surface -3-. The side face -4-, in this case, is realized in such a manner that the top portion -4a- extends along the part cutting edges -9- in each case at a constant clearance angle -ϵ1- in relation to the axis of symmetry -S-, i.e. the main cutting edges -10- and the secondary cutting edges -12- are at the same clearance angle -ϵ1-. The clearance angle -ϵ1- can be, for example, approximately 8°. The bottom portion -4b- also has a constant angle -ϵ2- in relation to the axis of symmetry -S- along the main cutting edges -10- and secondary cutting edges -12-, said angle, however, being greater than in the top portion -4a-. The angle -ϵ2- can be, for example, approximately 15°.

Figure 10A:
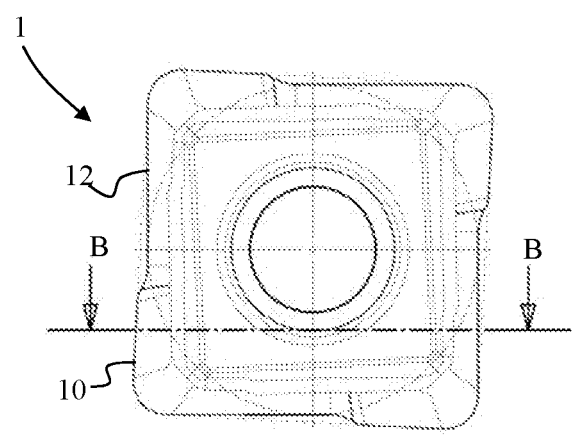
FIG. 10a shows a top view corresponding to FIG. 1 onto the drill cutting insert as claimed in the first embodiment.
Figure 10B:
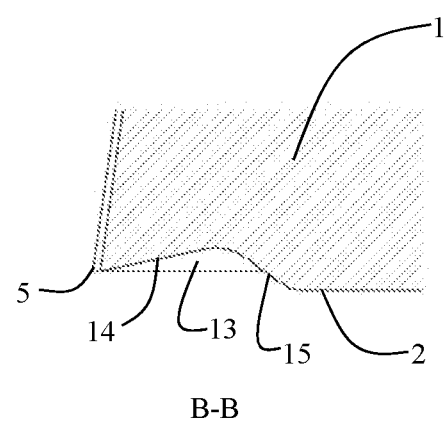

The top surface -2- of the drill cutting insert -1- is provided with a chip-conducting structure -13-, as is explained in more detail below with reference to FIGS. 10a and 10b. The chip-conducting structure -13- is formed by a rake face -14- which declines from the cutting edge -5- in the direction of the bottom surface -3- and a face -15- which connects thereto and inclines toward the center of the drill cutting insert -1- such that the chip-conducting structure -13- is in the form of a hollowed channel in the top surface -2-. As can be seen, in particular, in FIG. 1 and FIG. 10a, the width of the chip-conducting structure -13- increases along the respective part cutting edges -9- from the secondary cutting edge -12- to the main cutting edge -10- such that the width of the chip-conducting structure -13- is greater in the region of the main cutting edge -10- than in the region of the secondary cutting edge -12-. In addition, the chip-conducting structure -13- is also realized so as to be deeper in the region of the main cutting edge -10- (measured from the height of the cutting edge -5- in a direction parallel to the axis of symmetry -S-) than in the region of the secondary cutting edge -12-. In this way, during drilling, particularly favorable chip formation is obtained which, in particular during initial drilling, i.e. on entry into the material to be drilled, results in a slow increase in the active cutting forces.

A drill tool -20-, which is provided with two of the drill cutting inserts -1- described beforehand, is described below.

FIG. 6 shows a detail of the drilling tool -20- in the region of an axial end on which the two drill cutting inserts -1- are arranged.

The drilling tool -20- has a basic body -21- which is rotatable about a longitudinal axis -L- for drilling. The basic body -21- is provided with two receiving portions for receiving in each case one drill cutting insert -1-. One of the two receiving portions serves as an inner receiving portion and the other receiving portion serves as an outer receiving portion. The receiving portions are realized in such a manner that the drill cutting inserts can be received therein in a captive and non-rotatable manner in an alignment which will be described in more detail below. The receiving portions, in particular in each case, have a threaded bore for receiving a screw which is guided through the bore -6- in the respective drill cutting insert -1-. In addition, the receiving portions can have, in each case, one or several contact faces, against which the respective drill cutting insert -1- received there can be supported in a form-fitting manner. The basic body -21- can be additionally provided with one or several chip-conducting grooves which will be described in less detail below. These types of developments are generally known and are consequently not described in any more detail here. The alignment in which the drill cutting inserts -1- are fastened on the basic body -21- will be described in more detail below.

FIG. 7 shows a top view onto the axial end of the drilling tool -20- along the longitudinal axis -L-. A first drill cutting insert -1- is fastened on the basic body -21- as an inner cutting insert -1a- and a second identical drill cutting insert -1- is fastened on the basic body -21- as an outer cutting insert -1b-. The inner cutting insert -1a- and the outer cutting insert -1b- are arranged at a different radial distance from the longitudinal axis -L- and substantially in a first plane -P1- which includes the longitudinal axis -L-. A second plane -P2-, which also includes the longitudinal axis -L-, extends vertically with respect to the first plane -P1-. The inner cutting insert -1a- is arranged in such a manner that it intersects the second plane -P2- and the active part cutting edge -9-, which protrudes beyond the basic body -21- in the axial direction (with reference to the longitudinal axis -L-), extends at an angle -γ- to the first plane -P1-. The angle -γ- can be, for example, approximately 5°. The inner cutting insert -1a-, in this case, is arranged in such a manner that the active part cutting edge -9- intersects the second plane -P2- at a small distance from the longitudinal axis -L- such that, in operation, the active part cutting edge -9- is arranged slightly behind the first plane -P1- with reference to the rotation about the longitudinal axis -L-. The inner cutting insert -1a- is consequently arranged "below center".

The outer cutting insert -1b- is arranged in such a manner that the active part cutting edge -9- thereof, which protrudes beyond the basic body -21- in the axial direction, extends at least substantially parallel to the first plane -P1- and, when the drilling tool -20- is operating, is arranged somewhat in front of the first plane -P1- with reference to the rotation about the longitudinal axis -L-.

The inner cutting insert -1a- and the outer cutting insert -1b- are consequently arranged in a different radial position with reference to a rotation about the longitudinal axis -L- when the drilling tool -20- is operating and are offset by approximately half a revolution with respect to one another.

Figure 8:
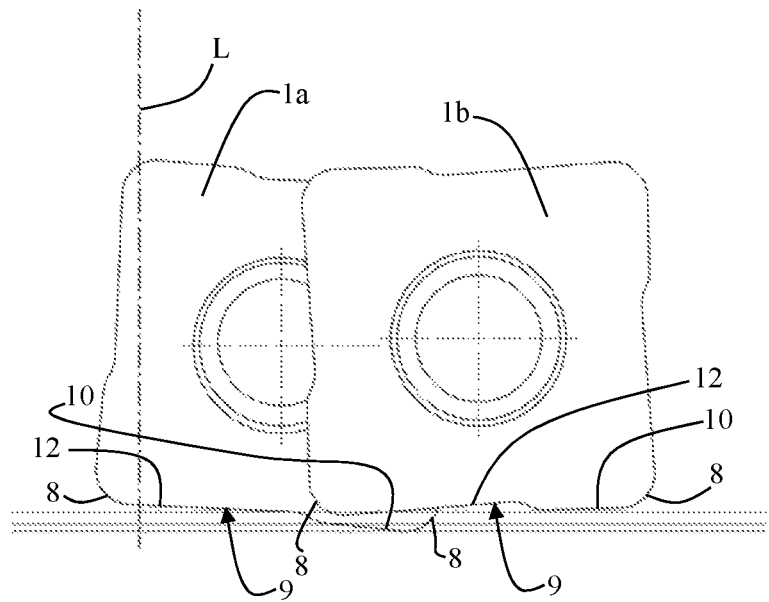
FIG. 8: shows a schematic representation to explain the alignment of active part cutting edges for a first diameter to be drilled.
Figure 9:
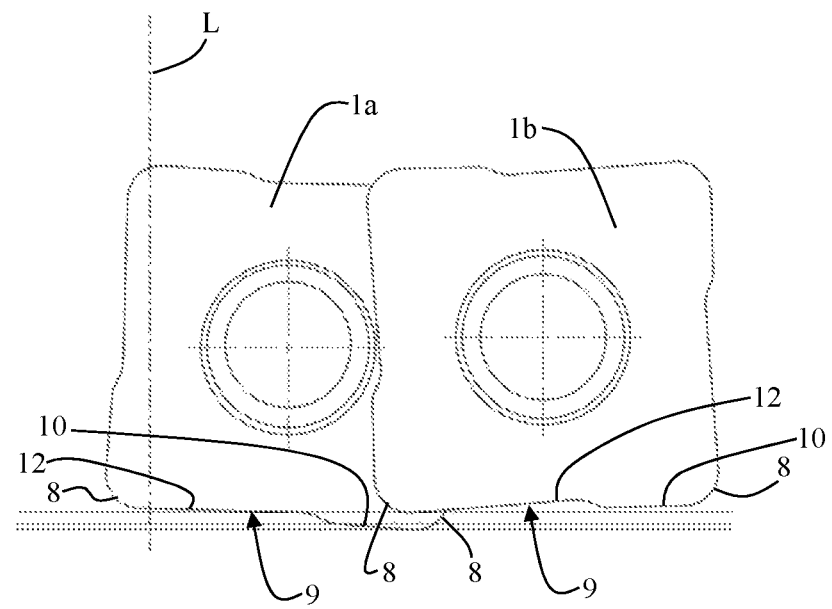
FIG. 9: shows a schematic representation to explain the alignment of active part cutting edges for a second diameter to be drilled.

With reference to FIG. 8 and FIG. 9, the alignment of the active part cutting edges -9- of the inner cutting insert -1a- and of the outer cutting insert -1b- are described below with reference to a plane vertically with respect to the longitudinal axis -L-. Only the cutting inserts -1a- and -1b- are shown in this case in both FIG. 8 and in FIG. 9 and the basic body -21- of the drilling tool -20- has been left out for clarification. In addition, in both FIG. 8 and FIG. 9 the outer cutting insert -1b- is shown rotated by approximately half a revolution about the longitudinal axis -L- in relation to its real position in order to indicate the relative alignment of the active part cutting edge -9- of the inner cutting insert -1a- and of the active part cutting edge -9- of the outer cutting insert -1b- with respect to one another.

FIG. 8 is a representation of the arrangement of the cutting inserts -1a- and -1b- for the smallest diameter to be drilled with the given cutting inserts, i.e. the arrangement where the outer cutting insert -1b- is arranged the furthest inside in the radial direction -R-. FIG. 9 is a representation of the arrangement of the cutting inserts -1a- and -1b- for the largest diameter to be drilled with the given cutting inserts, i.e. the arrangement where the outer cutting insert -1b- is arranged the furthest outside in the radial direction -R-. The different diameters to be drilled are provided in the case of the described arrangement of two identical drill cutting inserts -1- by means of a change in the radial position of the outer cutting insert -1b-. With arrangements of the outer cutting insert -1b- in radial positions which are situated between the extreme positions shown in FIG. 8 and FIG. 9, it is possible to adjust diameters to be drilled between the largest diameter to be drilled and the smallest diameter to be drilled.

As can clearly be seen in FIG. 8 and FIG. 9, the paths of movement of the inner cutting insert -1a- and of the outer cutting insert -1b- overlap in part when rotating about the longitudinal axis -L-. In this way the achievement is that, with the respective alignment of the cutting inserts -1a- and -1b-, inactive part cutting edges -9- and cutting corners -8- are arranged in a protected manner such that they do not engage with the material to be drilled and consequently do not become worn. Said effect is realized for all the diameters to be drilled. The inner cutting insert -1a- is arranged in such a manner that it juts out further from the basic body -21- in the axial direction than the outer cutting insert -1b-.

The alignment of the inner cutting insert -1a- will be described first of all by way of FIG. 8 (or FIG. 9).

As can be seen in FIG. 8, the main cutting edge -10- of the active part cutting edge -9- of the inner cutting insert -1a- is aligned inclinedly with respect to the longitudinal axis -L- in such a manner that its region which is distanced further from the longitudinal axis -L- in the radial direction -R- (i.e. the region adjoining the cutting corner -8- or the radially outer region) protrudes further in the axial direction than its region which is arranged closer to the longitudinal axis -L- in the radial direction -R- (i.e. its region adjoining the transition portion -11- or its radially inner region). The main cutting edge -10- extends at an angle -δ1- in relation to a plane vertically with respect to the longitudinal axis -L-, as is shown in FIG. 6b. This means that when the drilling tool -20- enters into the material to be drilled, the region of said main cutting edge -10- which is situated further outside in the radial direction -R- engages with the material to be drilled earlier than the region of said main cutting edge -10- which is situated further inside in the radial direction. As a result of said alignment of the main cutting edge -10- of the inner cutting insert -1a-, the inner cutting insert -1a- brings about a small, outwardly acting resultant force onto the basic body -21- during drilling.

The secondary cutting edge -12- of the active part cutting edge -9- of the inner cutting insert -1a- is also aligned inclinedly with respect to the longitudinal axis -L- in such a manner that its region which is distanced further from the longitudinal axis -L- in the radial direction -R- (i.e. the region adjoining the transition portion -11- or the radially outer region) protrudes further in the axial direction than its region which is arranged further inside in the radial direction -R- (i.e. the region adjoining the other cutting corner -8- or the radially inner region). The secondary cutting edge -10- extends at an angle -δ2- in relation to a plane vertically to the longitudinal axis -L-, as is shown in FIG. 6b. In this way the achievement is that the cutting corner -8- which is situated inside does not engage with the material to be drilled and consequently is not worn in the case of said alignment of the inner cutting insert -1a-.

The alignment of the active part cutting edge -9- of the outer cutting insert -1b- is described in more detail below.

As can be seen in FIG. 8 (and FIG. 9), the main cutting edge -10- of the active part cutting edge -9- of the outer cutting insert -1b- is aligned with respect to the longitudinal axis -L- in such a manner that its region which is arranged closer to the longitudinal axis -L- in the radial direction -R- (i.e. the region adjoining the transition portion -11- or the radially inner region) protrudes further in the axial direction than its region which is distanced further from the longitudinal axis -L- in the radial direction -R- (i.e. the region adjoining the cutting corner -8- or the radially outer region). The main cutting edge -10- extends at an angle -δ3- in relation to a plane vertically to the longitudinal axis -L-, as is shown in FIG. 6b. In this way, the achievement is that, during drilling, the main cutting edge -10- of the outer cutting insert -1b- exerts a light, inwardly acting force onto the basic body -21- of the drilling tool -20-. Said force is consequently in opposition to the force brought about by the main cutting edge -10- of the inner cutting insert -1a-, which results in the drilling tool -20- being stabilized during drilling.

The secondary cutting edge -12- of the active part cutting edge -9- of the outer cutting insert -1b- is aligned inclinedly with respect to the longitudinal axis -L- in such a manner that the region which is arranged closer to the longitudinal axis in the radial direction -R- (i.e. the region adjoining the cutting corner -8- or the radially inner region) protrudes further in the axial direction than the region which is distanced further from the longitudinal axis -L- in the radial direction -R- (i.e. the region adjoining the transition portion -11- or the radially outer region).

As a result of the described alignment of the main cutting edges -10- and of the secondary cutting edges -12- of the inner cutting insert -1a- and of the outer cutting insert -1b-, only relatively small forces occur during penetration into the material to be drilled and the drilling process is very quickly stabilized. As a result of the alignment of the individual portions of the active part cutting edges -9- with respect to one another, channels are generated in the front face of the material to be drilled during drilling, said channels bringing about guidance and stabilization which enable a high level of processing accuracy in particular when deep holes are drilled.

In addition, the achievement with the described alignment is that the part cutting edge -9- of the outer cutting insert -1b- situated radially outside does not engage with the side wall of the drilled hole, but realizes a space to the same. In this way, it is ensured that said non-active part cutting edge -9- is not worn in the case of the given alignment of the outer cutting insert -1b-.

Figure 5:
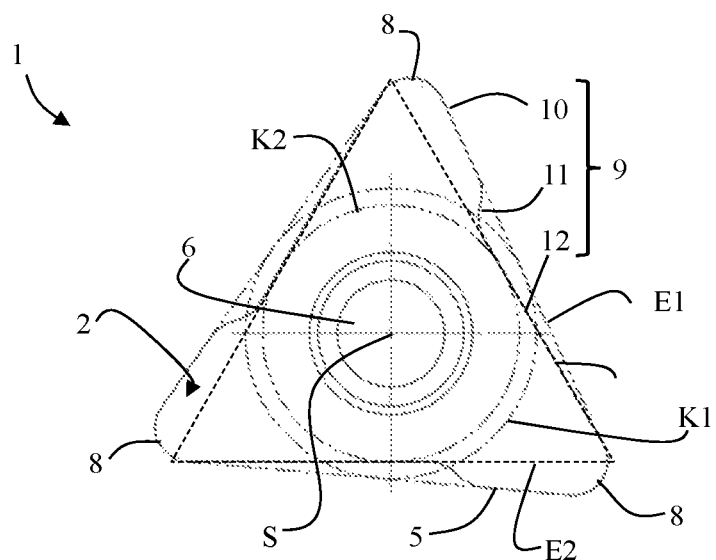
FIG. 5: shows a schematic representation corresponding to FIG. 4 of a drill cutting insert as claimed in a second embodiment.

A second embodiment of the drill cutting insert -1- is described below with reference to FIG. 5.

The drill cutting insert -1- as claimed in the second embodiment differs from the first embodiment described beforehand in that it has a substantially triangular form instead of the substantially square basic form described beforehand. The second embodiment differs from the first embodiment only in the different development of the form when looking onto the top surface -2- such that only the differences by way of the top view onto the top surface -2- are described below. In addition, the same references are used for the corresponding regions with reference to the second embodiment.

The drill cutting insert -1- as claimed in the second embodiment has a top surface -2-, a bottom surface -3- and a circumferential side face -4- which connects the top surface -2- and the bottom surface -3- together. A cutting edge -5-, which is also realized in a circumferential manner along the entire edge of the top surface -2- in the case of the second embodiment, is formed at the transition between the side face -4- and the top surface -2-. The drill cutting insert -1- has an axis of symmetry -S- which extends vertically with respect to the drawing plane in FIG. 5. The drill cutting insert -1- as claimed in the second embodiment has three-fold rotational symmetry (n=3) about the axis of symmetry -S-, i.e. the drill cutting insert -1- has this same form when rotated by 120° about the axis of symmetry -S-. There is provided a bore -6- which extends concentrically to the axis of symmetry -S- and penetrates the drill cutting insert -1- from the top surface -2- to the bottom surface -3-. The bore -6- is surrounded by a circumferential face -7- which extends in a plane vertically with respect to the axis of symmetry -S-.

The drill cutting insert -1-, in a top view onto the top surface -2-, has a substantially triangular basic form which is modified in some regions, as will be described in more detail below. The drill cutting insert -1- has three cutting corners -8-. Part cutting edges -9-, which—just as the cutting corners -8-—form portions of the cutting edge -5-, extend in each case between two adjacent cutting corners -8-. The part cutting edges -9- are in each case realized in an identical manner and have a main cutting edge -10-, a transition portion -11- and a secondary cutting edge -12-. The main cutting edge -10- connects to the one cutting corner -8- which defines the respective part cutting edge -9- and the secondary cutting edge -12- connects to the other cutting corner -8- which defines the respective part cutting edge -9-. The main cutting edge -10- and the secondary cutting edge -12- merge into one another by means of the transition portion -11-, i.e. the transition portion -11- is a separate portion of the part cutting edge -9- which connects the main cutting edge -10- and the secondary cutting edge -12- together. In a top view onto the top surface -2-, which extends substantially vertically with respect to the axis of symmetry -S-, the main cutting edge -10- extends in a straight manner. The secondary cutting edge -12- also extends in a straight manner in a top view onto the top surface -2-. The transition portion -11- has a convex portion adjoining the main cutting edge -10- and a concave portion adjoining the secondary cutting edge -12-.

As in the case of the first embodiment, the cutting edge -5- extends over its entire development in a plane which extends vertically with respect to the axis of symmetry -S-, i.e. the cutting edge -5- extends in the same plane vertically with respect to the axis of symmetry -S- in the region of the cutting corners -8-, in the region of the main cutting edges -10-, in the region of the transition portions -11- and in the region of the secondary cutting edges -12-.

The main cutting edges -10- of, in each case, two adjacent part cutting edges -9- extend at an angle of 60° with respect to one another (as n=3) such that the main cutting edges -10- extend along the contour of an imaginary first triangle (n-corner where n=3). In other words, in their extension, the main cutting edges -10- form tangents to a first circle about the axis of symmetry -S- of the drill cutting insert -1-.

The secondary cutting edges -12- of, in each case, two adjacent part cutting edges -9- also extend at an angle of 60° with respect to one another (as n=3) such that the secondary cutting edges -12- extend along the contour of an imaginary second triangle (n-corner where n=3). In other words, the secondary cutting edges -12- form tangents to a second circle which is concentric to the first circle. The radius of the second circle, in this case, (as in the case of the first embodiment) is smaller than the radius of the first circle. In other words, the edge length of the second triangle is smaller than the edge length of the first triangle.

The imaginary first triangle is tilted by an angle -β- with reference to the axis of symmetry -S- in relation to the imaginary second triangle in such a manner that the main cutting edge -10- and the secondary cutting edge -12- of a part cutting edge -9- form, in each case, an exterior angle -α- (=180°-β-) with one another which is less than 180° such that an end of the secondary cutting edge -12- which connects to the transition portion -11- is arranged offset in the direction of the axis of symmetry -S- in relation to a connecting line which connects two adjacent cutting corners -8-. The angle -β-, in this case, is between 1° and 7°, in a preferred manner between 2° and 5° and in a most preferred manner is 3°. The cutting corner -8- itself also has a constant corner radius in the case of the second embodiment.

The radius ratios of the circles are also selected in the second embodiment in such a manner that an extension of the main cutting edge -10- would intersect the cutting edge -5- at the point where the secondary cutting edge -12- merges into the adjoining cutting corner -8-. As has already been explained with reference to the first embodiment, said realization is not absolutely necessary in the case of the second embodiment either.

The top surface -2- of the drill cutting insert -1- can be provided with suitable chip-conducting structures in a manner known per se also in the case of the second embodiment.

Two identical drill cutting inserts -1- as claimed in the second embodiment can be arranged on a drilling tool -20- as an inner cutting insert -1a- and an outer cutting insert -1b- in such a manner that, in each case, one part cutting edge -9- forms an active part cutting edge -9- which protrudes beyond the basic body -21- of the drilling tool -20- in the axial direction. The active part cutting edges -9- of the inner cutting insert -1a- and of the outer cutting insert -1b-, in this case, are arranged as claimed in the second embodiment in such a manner that they extend in such a manner as has been described above with reference to the first embodiment, i.e. with the same alignment with reference to the longitudinal axis -L-.

The invention claimed is:

1. A drill cutting insert, comprising:
   a top surface, a bottom surface, and a circumferential side face connecting said top surface with said bottom surface;
   a cutting edge formed at a transition between said side face and said top surface, said cutting edge having n identical cutting corners and n identical partial cutting edges, each extending between two respective said cutting corners, where n∈{3, 4};
   each of said n partial cutting edges having:
      a main cutting edge adjoining a first cutting corner, said main cutting edge being straight in a top plan view onto said top surface;
      a secondary cutting edge adjoining another cutting corner, said secondary cutting edge being straight in a top plan view onto said top surface;
      said top surface being formed with a chip-conducting structure, having an increasing width along a partial cutting edge from said secondary cutting edge to said main cutting edge;
      a transition portion, by way of which said main cutting edge and said secondary cutting edge merge into one another, said transition portion having a convex portion adjoining said main cutting edge and a concave portion adjoining said secondary cutting edge; and
      said main cutting edge and said secondary cutting edge enclosing an angle α<180° with one another on an outside in a top view onto said top surface.

2. The drill cutting insert according to claim 1, wherein said main cutting edge of a partial cutting edge and said secondary cutting edge of an adjacent partial cutting edge enclose an acute angle with one another and thereby forming an acute cutting corner.

3. The drill cutting insert according to claim 1, wherein said n main cutting edges extend along a contour of an imaginary first n-corner and the n secondary cutting edges extend along a contour of an imaginary second n-corner which has a smaller edge length than the imaginary first n-corner.

4. The drill cutting insert according to claim 1, comprising an axis of symmetry, about which there is n-fold rotational symmetry.

5. The drill cutting insert according to claim 4, wherein a bore is formed to extend between said top surface and said bottom surface concentrically with respect to said axis of symmetry.

6. The drill cutting insert according to claim 4, wherein said cutting edge extends in a plane that extends perpendicularly with respect to said axis of symmetry.

7. The drill cutting insert according to claim 1, wherein said circumferential side face is developed to form a positive clearance angle along an entire said cutting edge.

8. The drill cutting insert according to claim 1, wherein a length of said main cutting edge amounts to between 20% and 80% of a length of said secondary cutting edge.

9. The drill cutting insert according to claim 1, wherein n=4.

10. A drilling tool, comprising:
    a basic body formed for rotation about a longitudinal axis;
    at least one inner cutting insert and an outer cutting insert mounted on said basic body;
    said inner and outer cutting inserts being identical cutting inserts, each being a drill cutting insert according to claim 1; and
    said outer cutting insert being disposed farther outside in a radial direction on said basic body than said at least one inner cutting insert.

11. The drilling tool according to claim 10, wherein:
    said inner cutting insert protrudes beyond said basic body in the axial direction by way of an active partial cutting edge and said outer cutting insert protrudes beyond said basic body in the axial direction by way of an active partial cutting edge;
    in the case of said active partial cutting edge of said inner cutting insert said secondary cutting edge is arranged closer to the longitudinal axis than said main cutting edge which is arranged in front in the axial direction; and in the case of said active partial cutting edge of said outer cutting insert said secondary cutting edge is arranged closer to the longitudinal axis than said main cutting edge.

12. The drilling tool according to claim 10, wherein:
said main cutting edge of said active partial cutting edge of said inner cutting insert is aligned such that a region thereof that is distanced farther from the longitudinal axis in the radial direction protrudes farther in the axial direction than a region thereof that is closer to the longitudinal axis in the radial direction; and
said main cutting edge of said active partial cutting edge of said outer cutting insert is aligned such that a region thereof that is closer to the longitudinal axis in the radial direction protrudes farther in the axial direction than a region thereof that is distanced farther from the longitudinal axis in the radial direction.

13. The drilling tool according to claim 10, wherein said secondary cutting edge of the active said partial cutting edge of said outer cutting insert is arranged with a region thereof that is arranged closer to the longitudinal axis in the radial direction protrudes farther in the axial direction than a region thereof that lies at a greater distance from the longitudinal axis in the radial direction.

14. A drilling tool, comprising:
a basic body formed for rotation about a longitudinal axis;
at least one exchangeable inner cutting insert and an exchangeable outer cutting insert mounted on said basic body farther outside in a radial direction on said basic body;
said inner and outer cutting inserts being identical cutting inserts and each having at least one partial cutting edge that projects beyond said basic body in an axial direction, each of said projecting partial cutting edges being identical, extending between two cutting corners, and each having:
  a straight main cutting edge adjoining a first cutting corner;
  a straight secondary cutting edge adjoining a second cutting corner; and
  a transition portion by way of which said main cutting edge and said secondary cutting edge merge into one another, said transition portion having a convex portion adjoining said main cutting edge and a concave portion adjoining said secondary cutting edge;
wherein, for each of said inner and outer cutting inserts, said main cutting edge is arranged at a greater distance from the longitudinal axis in the radial direction than said secondary cutting edge;
wherein said inner cutting insert is arranged with said main cutting edge thereof axially in front of said secondary cutting edge and is aligned with a region thereof that is distanced farther from the longitudinal axis in the radial direction protrudes farther in the axial direction than a region thereof that is arranged closer to the longitudinal axis in the radial direction; and
wherein said outer cutting insert is arranged with said main cutting edge aligned such that a region thereof that is closer to the longitudinal axis in the radial direction protrudes farther in the axial direction than a region thereof that is distanced farther from the longitudinal axis in the radial direction.

15. The drilling tool according to claim 14, wherein said secondary cutting edge of the active said partial cutting edge of said outer cutting insert is arranged with a region thereof that is arranged closer to the longitudinal axis in the radial direction protrudes farther in the axial direction than a region thereof that lies at a greater distance from the longitudinal axis in the radial direction.

* * * * *